United States Patent [19]

Iizuka et al.

[11] 4,285,250
[45] Aug. 25, 1981

[54] CONTROL LEVER FOR A TRANSMISSION

[75] Inventors: Takehiko Iizuka; Kunio Ui, both of Komatsu, Japan

[73] Assignee: Kabushiki Kaisha Komatsu Seisakusho, Tokyo, Japan

[21] Appl. No.: 113,315

[22] Filed: Jan. 18, 1980

[30] Foreign Application Priority Data

Jan. 23, 1979 [JP] Japan .................... 54-5974[U]

[51] Int. Cl.³ .................... G05G 9/02; G05G 9/12
[52] U.S. Cl. .................... 74/473 P; 74/471 R; 74/473 R; 137/636.2
[58] Field of Search .......... 74/471 R, 471 XY, 473 R, 74/473 P; 137/636.2

[56] References Cited

U.S. PATENT DOCUMENTS

| 2,077,578 | 4/1937 | Neracher | 74/473 P |
| 2,174,504 | 9/1939 | Cole | 74/473 P |
| 2,198,662 | 4/1940 | Fishburn | 74/473 R |
| 2,964,964 | 12/1960 | Craig | 74/473 R |
| 3,264,892 | 8/1966 | Boman et al. | 74/473 R |

Primary Examiner—Allan D. Herrmann
Attorney, Agent, or Firm—Armstrong, Nikaido, Marmelstein & Kubovcik

[57] ABSTRACT

A control lever for a transmission of a vehicle comprising a frame of the vehicle, a pair of rods pivotally connected to the control lever, which rods are arranged at right angles with each other, a housing fixedly secured to the frame, a spherical bearing for mounting the control lever on the housing, the spherical bearing comprising an outer race mounted in the housing, and a spherical bushing mounted on the control lever within the outer race so as to allow a sliding contact of the spherical bushing with the outer race, a cover fixedly secured to the control lever, which cover has a pair of guide slots formed therein positioned diametrically opposite sides to each other relative to the control lever, and a pair of guide pins fixedly secured to the housing, which guide pins are aligned with other in a direction parallel to one of the rods and adapted to be inserted within the guide slots.

4 Claims, 4 Drawing Figures

CONTROL LEVER FOR A TRANSMISSION

BACKGROUND OF THE INVENTION

This invention relates to an improvement in a control lever for a transmission of a vehicle which is capable of being controlled in two different directions. When it is required to control more than two control valves by a single control lever, the control lever is preferably operated in two different directions. In a conventional control lever of the type specified, the control lever is pivotally connected to one end of an arm which is slidably and rotatably mounted within a sleeve which, in turn, is fixedly secured to a frame of a vehicle. The other end of the arm is pivotally connected to a rod for operating a control valve while the leading end of the control lever is pivotally connected to another rod for operating another control valve. The two rods are usually arranged at right angles with each other.

The above mentioned conventional control lever is complicated in construction and requires a lot of spaces to be installed. Besides, it is expensive and difficult to seal a required portion of the control lever.

SUMMARY OF THE INVENTION

It is therefore an object of the present invention to provide a control lever for a transmission of a vehicle, which is simple in construction and yet provides two-direction operability.

Another object of the present invention is to provide a control lever for a transmission of a vehicle which can enhance reliability thereof and easily obtain a sealed structure of a required portion thereof.

In accordance with an aspect of the present invention, there is provided a control lever for a transmission of a vehicle, comprising:

a frame of the vehicle;

a housing fixedly secured to said frame;

spherical bearing means for mounting said control lever on said housing, said spherical bearing means comprising an outer race mounted on said housing, and a spherical bushing mounted on said control lever within said outer race so as to allow a sliding contact of said spherical bushing with said outer race;

a pair of rod means pivotally connected to said control lever means, said rod means being arranged at right angles with each other;

a cover fixedly secured to said control lever, said cover having a pair of guide slots formed therein positioned diametrically opposite sides to each other relative to said control lever; and a pair of guide pins fixedly secured to said housing, said guide pins being aligned with each other in a direction parallel to one of said rod means and adapted to be inserted within said respective guide slots.

In accordance with another aspect of the present invention, there is provided a control lever for a transmission of a vehicle, comprising:

a frame of the vehicle;

a pair of rod means pivotally connected to said control lever means, said rod means being arranged at right angles with each other;

a housing fixedly secured to said frame;

spherical bearing means for mounting said control lever on said housing, said spherical bearing means comprising an outer race mounted on said housing, said outer race having formed therein a pair of diametrically opposed holes which are aligned with each other in a direction parallel to one of said rod means, and a spherical bushing mounted on said control lever within said outer race so as to allow a sliding contact of said spherical bushing with said outer race, said spherical bushing having formed therein a pair of diametrically opposed slots; and a pair of guide pins each adapted to be inserted into said respective holes and engage with said respective slots.

The above and other objects, features and advantages of the present invention will be readily apparent from the following description taken in conjunction with the accompanying drawings.

DESCRIPTION OF THE PREFERRED EMBODIMENTS

Figure 1:
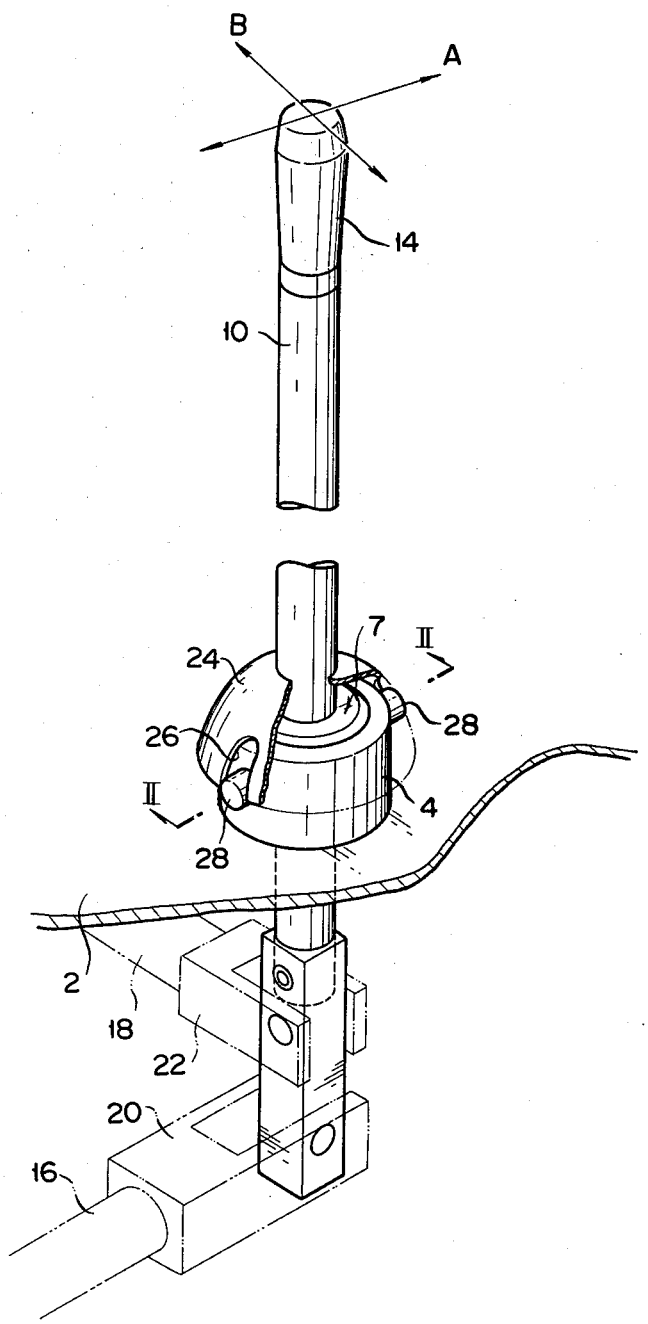
FIG. 1 is a perspective view partly broken away of a control lever according to the present invention.
Figure 2:
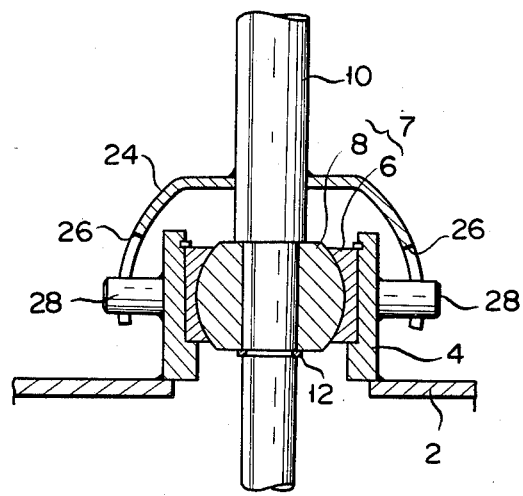
FIG. 2 is a cross-sectional view taken along the line II—II of FIG. 1.

The present invention will now be described in detail with reference to the accompanying drawings. Referring to FIGS. 1 and 2, reference numeral 2 denotes a floor frame of a vehicle to which a cylindrical housing 4 is fixedly secured by means of welding or the like. Mounted within the housing 4 is an outer race 6 of a spherical bearing 7 in which a spherical bushing 8 of the bearing 7 is rotatably mounted. The spherical bushing 8 is mounted on a control lever 10 for a transmission (not shown) and secured thereto by a snap ring 12. The upper end of the control lever 10 is formed into a grip 14.

Pivotally connected to the lower end portion of the control lever 10 are connection rods 16 and 18 arranged at right angles to each other. One end of the each connection rod 16 or 18 is formed into a yoke 20 or 22 and through which the each connection rod is pivotally connected to the control lever 10. The other ends of the connection rods 16 and 18 may be connected to control valves (not shown) for controlling the transmission of a vehicle.

Fixedly secured to the control lever 10 by welding is a semi-spherical cover 24 which has formed therein a pair of diametrically opposed slots 26. Inserted into the slots 26 and welded to the housing 4 are a pair of guide pins 28 which have a common center axis passing through the revolution center of the spherical bushing 8. The guide pins 28 are arranged parallel to the connection rod 16 thereby allowing the control lever 10 to be moved in two directions designated by arrows A and B in FIG. 1, each crossing the other at right angles. The direction A virtually corresponds to the longitudinal axis of the connection rod 16 and the direction B coincides with the longitudinal axis of the connection rod 18.

Figure 3:
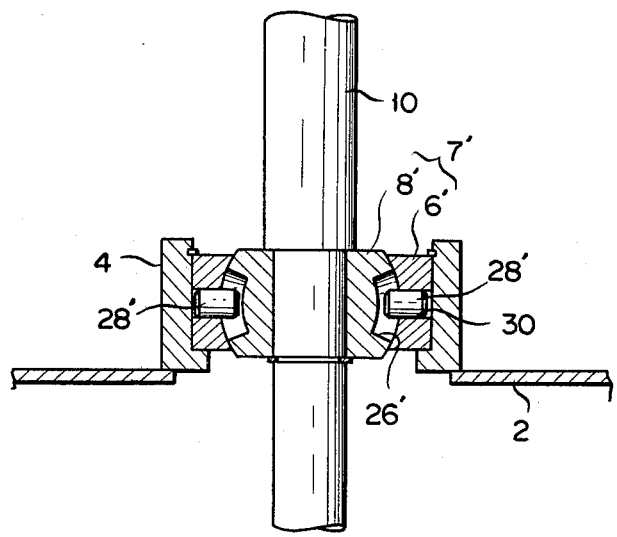
FIG. 3 is similar to FIG. 2 but showing another embodiment of the present invention.
Figure 4:
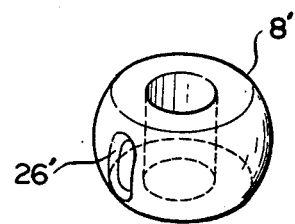
FIG. 4 is a perspective view of a spherical bushing of FIG. 3.

FIGS. 3 and 4 show another embodiment of the present invention in which diametrically opposed guide slots or grooves 26' are formed in a spherical bushing 8' while a pair of diametrically opposed holes 30 are drilled in an outer race 6' of a spherical bearing 7'. A pair of guide pins 28' are embedded into the holes 30 and each engages with the respective guide slots 26'. The guide pins 28' are aligned with each other and a common center axis thereof passes through the revolution center of the spherical bushing 8'. In this embodiment, the cover 24 of the embodiment shown in FIGS. 1 and 2 can be omitted.

Since the present invention is constructed as mentioned hereinabove, the control lever 10 can be swiveled about the pins 28 in the direction of A and also swiveled about the revolution center of the spherical bushing 8 in the direction of B guided by the guide slots 26.

Therefore, with simple construction employing the spherical bearing 7, the control lever 10 can operate more than two independent actuators.

According to the first embodiment, since the spherical bearing 7 is covered by the cover 24, sealing structure can easily be obtained without using a bellow-shaped boot.

While the invention has been described and shown with particular reference to the preferred embodiments, it will be apparent that many modifications might be possible that would fall within the scope of the present invention, which is not intended to be limited except as defined in the following claims.

What we claim is:

1. A control lever for a transmission of a vehicle, comprising:

a frame of the vehicle;

a housing fixedly secured to said frame;

spherical bearing means for mounting said control lever on said housing, said spherical bearing means comprising an outer race mounted on said housing, and a spherical bushing mounted on said control lever within said outer race so as to allow a sliding contact of said spherical bushing with said outer race;

a pair of rod means pivotally connected to said control lever means, said rod means being arranged at right angles with each other;

a cover fixedly secured to said control lever, said cover having a pair of guide slots formed therein positioned diametrically opposite sides to each other relative to said control lever; and a pair of guide pins fixedly secured to said housing, said guide pins being aligned with each other in a direction parallel to one of said rod means and adapted to be inserted within said respective guide slots.

2. A control lever for a transmission of a vehicle as set forth in claim 1 wherein the center axis of said guide pins passes through the revolution center of said spherical bushing.

3. A control lever for a transmission of a vehicle, comprising:

a frame of the vehicle;

a pair of rod means pivotally connected to said control lever means, said rod means being arranged at right angles with each other;

a housing fixedly secured to said frame;

spherical bearing means for mounting said control lever on said housing, said spherical bearing means comprising an outer race mounted on said housing, said outer race having formed therein a pair of diametrically opposed holes which are aligned with each other in a direction parallel to one of said rod means, and a spherical bushing mounted on said control lever within said outer race so as to allow a sliding contact of said spherical bushing with said outer race, said spherical bushing having formed therein a pair of diametrically opposed slots; and a pair of guide pins each adapted to be inserted into said respective holes and engage with said respective slots.

4. A control lever for a transmission of a vehicle as set forth in claim 3 wherein the center axis of said guide pins passes through the revolution center of said spherical bushing.

* * * * *